No. 882,209. PATENTED MAR. 17, 1908.
W. A. REID.
DRUM TRAP.
APPLICATION FILED JUNE 9, 1905.
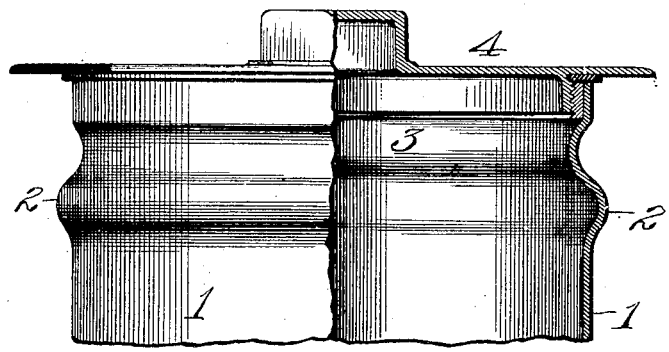
Fig. I.
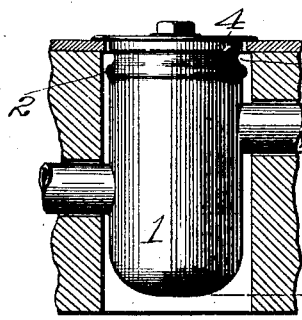
Fig. II.
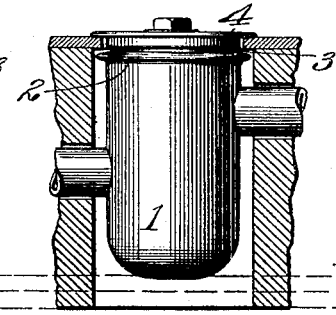
Fig. III.
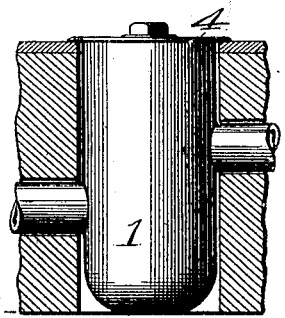
Fig. IV.
Attest:
Inventor:
Wm. A. Reid,
by Knight Bros
Attys.

UNITED STATES PATENT OFFICE.

WILLIAM A. REID, OF ST. LOUIS, MISSOURI, ASSIGNOR TO N. O. NELSON MANUFACTURING COMPANY, OF ST. LOUIS, MISSOURI, A CORPORATION.

DRUM-TRAP.

No. 882,209.  Specification of Letters Patent.  Patented March 17, 1908.

Application filed June 9, 1905. Serial No. 264,367.

*To all whom it may concern:*

Be it known that I, WILLIAM A. REID, a citizen of the United States, residing in the city of St. Louis, in the State of Missouri, have invented certain new and useful Improvements in Drum-Traps, of which the following is a full, clear, and exact description, reference being had to the accompanying drawing, forming part of this specification.

My invention relates to a drum trap for plumbing utility and the invention has for its object to construct a trap of the type named in such manner that it may be readily expanded or contracted longitudinally to render it of such length that its upper end will occupy a position corresponding to the level of the floor of a building in which the trap is used. It frequently happens that when the plumbing pipes to which a drum trap is to be fitted are laid beneath a floor level, they are improperly positioned for the connection of the drum trap thereto in a manner that will cause the top of the trap to correspond with the level of the floor when the trap is connected to said pipes.

With a trap constructed in accordance with my improvement it may be readily distended in length or shortened on making connection with the pipes, whereby the top of the trap is brought to the desired elevation.

Figure I is a view partly in elevation and partly in vertical section of my trap. Fig. II is an elevation of my trap set into the floor and in the condition in which it is originally produced. Fig. III is a view similar to Fig. II showing the trap contracted longitudinally to lessen its length. Fig. IV is a similar view to Figs. II and III, showing the trap expanded longitudinally to increase its length.

1 designates the body of my trap, which is usually made of lead. The wall of this body is corrugated annularly to provide a plurality of convolutions, preferably two in number, and one of which projects outwardly beyond the circumferential face in the shape of a bead 2 and another of which extends inwardly from the first in the shape of an inwardly projecting bead 3, which is out of line with the inner face of the body 1. By thus forming corrugations in the body of the trap, I shorten its original length and so dispose the corrugated portions of the body that when the corrugations are obliterated or drawn out by expansion the trap body will be lengthened. By this construction I also provide for contraction of the length of the trap when pressure is applied thereto in a direction longitudinally of its body as a result of which the metal in the corrugations is folded and the length of the trap body diminished. By making a plurality of corrugations or beads in the body of the trap, I provide for the action of one of the corrugations against another in that an inwardly or outwardly extending portion of the trap body will give inwardly or outwardly, as the case may be, against the oppositely disposed corrugation, thereby rendering the act of expanding or contracting the trap body one accomplished with much greater readiness and ease than would be the result in making a single annular indentation or producing a single annular expanded portion in the trap body. This construction also provides for a much greater degree of expansion or contraction of a trap body than would be possible with the formation of a single expansion or indentation of the body.

4 designates the cover applied to the trap body which may be of any ordinary shape common to drum traps and for which no invention is herein claimed.

In Fig. II my trap is shown connected to an inlet and an outlet pipe leading thereto and therefrom and as it appears seated in a pocket produced therefor in the floor of a building. As illustrated in this view the trap is in its normal condition, which condition it is allowed to retain, due to the pipes leading to and from it being properly placed in the floor.

In Fig. III the trap is shown in condition which is necessitated by the pipes leading thereto and therefrom being located in the floor at a greater elevation than they should properly be, and as a consequence of which it is necessary to raise the trap so that the pipes may be connected thereto at the proper points or, in other words at the locations of the pipe openings. By so elevating the trap for the connection of the pipes its upper end naturally protrudes above the floor level and for the purpose of lowering the top of the trap to the floor level it is contracted in length by pressure exerted endwise or longitudinally of the trap body. When such pressure is applied the corrugations in the trap body yield and become folded with the desired result.

In the trap as shown in Fig. IV the pipes leading thereto and therefrom are illustrated as located at elevations too low for the proper connection of the trap thereto. In view of this the body of the trap is lengthened by expanding it, such expansion being permitted by the corrugations which are drawn out into straight condition to render the body of the desired length.

I claim as my invention:

A drum trap of soft metal having an open upper and a closed lower end and having in its wall, near its upper end, a pair of beads; one of said beads extending inwardly beyond the inner plane of the remainder of the wall of the drum and the other bead extending outwardly beyond the outer plane of the remainder of the wall of the drum, and pipes extending from the wall of the drum.

WILLIAM A. REID.

In presence of—
  NELLIE V. ALEXANDER,
  BLANCHE HOGAN.